point is on said first given axis, and the connection of said spring to said beam being rotatable about said first given axis when said beam is in said given position; and said spring being arranged to exert force directed along its length and between the said points;

said relay including means for adjusting the length of said spring, said spring's said force being a function of the length thereof and there being adjustable zero spring means acting on said beam.

* * * * *

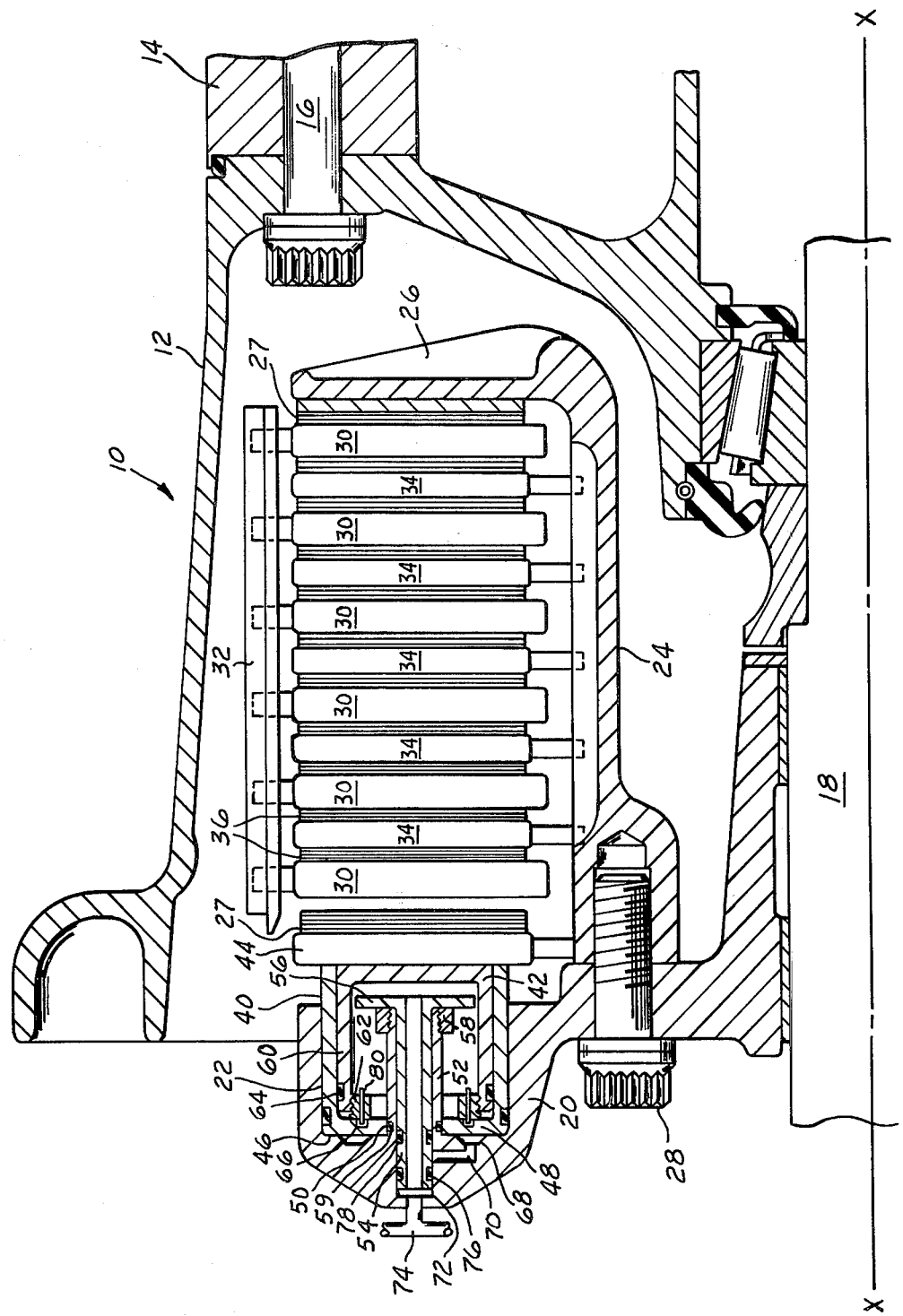

3,915,063

EXTENSIBLE PISTON

BACKGROUND OF THE INVENTION

The present invention relates to fluid pressure actuated force generating pistons having an extended range of travel.

Fluid pressure actuated pistons of the extensible type of which I am aware are not entirely satisfactory for use in aircraft disc brakes for one or more reasons as, for example, structural complexity, weight and space requirements, operating life and reliability, maintenance requirements and/or assembly and disassembly problems.

SUMMARY OF THE INVENTION

The present invention provides a fluid pressure actuated piston particularly adapted for use in aircraft multiple disc brakes and characterized by structural simplicity, reliable operation and ease of assembly or disassembly.

The present invention provides a fluid pressure actuated piston slidably contained in a normally retracted pressure actuated cylinder which cylinder is automatically pressurized to advance the same relative to the piston as the latter reaches a predetermined axial position in the cylinder.

The present invention provides a fluid pressure actuated piston slidably contained by a normally retracted fluid pressure actuated cylinder and movable in the cylinder to a predetermined position relative thereto to actuate a valve thereby venting pressurized fluid to the cylinder which is advanced axially relative to the piston thereby extending the range of piston travel accordingly.

BRIEF DESCRIPTION OF THE DRAWING

The drawing represents a sectional schematic showing a conventional fluid pressure actuated multiple disc aircraft brake embodying the present invention.

DESCRIPTION OF THE PREFERRED EMBODIMENT

Referring to the drawing, numeral 10 designates an aircraft wheel and multiple disc brake therefor. The wheel is defined by two annular sections 12 and 14, only one of which is fully shown, fastened together by circumferentially spaced apart bolts and nuts generally indicated by 16. The wheel is suitably journaled on a rotatably fixed axle 18 carried by conventional aircraft landing gear structure, not shown. An annular brake carrier 20 suitably keyed or otherwise secured to axle 18 is provided with a plurality of circumferentially spaced-part cavities 22, only one of which is shown, vented to a source of pressurized fluid, not shown, controlled by the aircraft pilot. A torque tube 24 having an integral backing plate 26 suitably lined with friction material 27 is fixedly secured to brake carrier 20 by a plurality of circumferentially spaced-apart bolts 28. A plurality of spaced-apart annular brake rotor members 30 are suitably keyed to a retaining member 32 fixedly secured to wheel section 12 and adapted to permit axial movement of the rotor members 30 relative to wheel section 12. A plurality of annular brake stator members 34 having friction lining 36 secured to opposite faces thereof are suitably keyed for axial movement to torque tube 24.

The cavities 22 are each provided with a sleeve or cylinder 40 slidably contained therein and adapted to slidably contain a fluid pressure actuated piston 42. The pistons 42 are adapted to be simultaneously pressurized and urged axially into engagement with an annular pressure plate 44 suitably keyed for axial movement to torque tube 24 which pressure plate 44 compresses the rotor and stator members 30 and 34 together against the resistance of backing plate 26 to retard rotation of rotor members 30 and thus the wheel attached thereto. The pressure plate 44, like backing plate 26, is lined with friction material 27.

It will be recognized that the pistons 42 are necessarily confined in a limited space and must have an axial travel range sufficient to compensate for the accumulative axial wear of the friction lining 26 and 27 over a period of brake use. To that end, the present invention provides circular cavity 22 adapted to slidably receive cylinder 40 which bottoms against an end wall 46 of cavity 22. The cylinder 40 is provided with an end wall 48 having a central opening 50 through which a tubular extension 52 integral with or otherwise fixedly secured to carrier 20 extends. A tubular member 54 having a radially outwardly extending flange portion 56 is slidably received by tubular extension 52. The tubular extension 52 is threaded at one end thereof to receive a nut 58 which acts as a stop as will be described. An "O" ring 59 disposed in a suitable recess in tubular extension 52 serves as a seal against leakage past adjacent surfaces of tubular extension 52 and end wall 48.

The piston 42 includes a skirt portion 60 which is threaded internally at one end thereof to receive a nut 62 which acts as a stop as will be described. The skirt portion 60 is suitably recessed to receive an "O" ring 64 which provides a fluid seal against leakage past adjacent surfaces of skirt portion 60 and cylinder 40.

The end wall 48 of cylinder 40 is exposed to an annular recess 68 which communicates via a passage 70 and bore 72 of tubular extension 52 with a supply conduit 74 which conduit 74 is vented to a controlled source of pressurized fluids not shown, under control of the aircraft pilot. The passage 70 is blocked by tubular member 54 which is suitably recessed to receive spaced-apart "O" rings 76 and 78 which provide a seal against leakage of pressurized fluid past the adjacent surfaces of tubular member 54 and tubular extension 52 to passage 70 when tubular member 54 is in a retracted position as shown in FIG. 1.

The nut 62 is provided with one or more pins 80 which extend therethrough into slidable engagement with associated recesses 66 in end wall 48 to fix the position of nut 62 rotationally relative to piston 42 during assembly as will be described.

Assembly of the above-described members in the cavities 22 may be accomplished by sliding cylinder 40 over tubular extension 52 into position abutting end wall 46. The nut 62 is inserted into cylinder 40 and pins 64 engaged with associated recesses 66 in end wall 46. The nut 58 is fastened to tubular extension 52 and tubular member 54 slipped into tubular extension 52 to a position where flange 56 bears against the end of tubular extension 52 and/or nut 58. The piston 42 is inserted into cylinder 40 and the skirt portion 60 urged into engagement with nut 62. The piston 42 may be suitably recessed, not shown, to permit engagement of a hand tool, not shown, which serves to rotate piston 42 in cylinder 40 thereby screwing skirt portion 60 on nut 62 rotation of which is resisted by engagement of pins 64 with end wall 46. It will be understood that the "O" rings 59, 64, 76 and 78 are inserted in the respective recesses prior to assembly of the above-described members.

Assuming that the present invention is in assembled condition as shown in FIG. 1, a brake application by the aircraft pilot results in pressurization of conduit 74 from which pressurized fluid passes through tubular members 54 into the chambers partially defined by pistons 42 thereby equally pressurizing pistons 42 into engagement with pressure plate 44 which, in turn, urges rotor and stator members 30 and 34 axially into engagement against backing plate 26 to produce the desired braking action of the wheel. It will be noted that the pressurized fluid acts against the end wall 48 of cylinder 40 thereby holding the same in contact with end wall 46 as piston 42 moves relative to cylinder 40.

Depressurization of conduit 74 results in a retraction of pressure plate 44 and thus pistons 42 bearing thereagainst by virtue of conventional retraction spring units, not shown, suitably connected to carrier 20 and pressure plate 44.

It will be recognized that repeated brake applications in the above-mentioned manner will result in wear of the friction materials 27 and 36 necessitating a corresponding greater axial displacement of piston 42 which displacement of pistons 42 is normally limited by the permissible travel in cylinder 40. Such limited displacement of pistons 42 may not permit taking full advantage of the wear capability of the friction materials 27 and 36. The present invention overcomes such an undesirable limitation by allowing piston 42 to move axially through cylinder 40 to the extent that nut 62 engages flange portion 56 whereupon continued axial movement of piston 42 causes tubular member 54 to move likewise through tubular extension 52 to uncover passage 70 thereby venting pressurized fluid from bore 72 to annular recess 68 and thus the entire end area of end wall 48 exposed thereto. It will be noted that there exists a significant differential effective area between opposite sides of end wall 48 such that with the same fluid pressure imposed on both sides of end wall 48 the resultant force unbalance will urge cylinder 40 axially along tubular extension 52 and into engagement with nut 58 thereby repositioning cylinder 40 relative to piston 42. The nut 58 acts as a stop against further movement of cylinder 40 within which piston 42 may continue to move in response to pressurization thereof to the extent required to compensate for wear of the friction materials 27 and 36. The extension of cylinder 40 and corresponding extended axial travel of piston 42 therein is believed more than sufficient to compensate for the maximum wear capability of the friction materials 27 and 36.

It will be noted that the brake actuating force is derived from the pistons 42 which have a constant effective area exposed to the pressurized fluid tending to actuate the same. The constant effective area assures a constant force output of the pistons 42 for a given fluid pressure applied thereto throughout the range of movement of pistons 42.

I claim:

1. Extensible fluid pressure actuated piston means particularly adapted for use in a multiple disc aircraft disc brake provided with fixed piston carrier means providing limited axial travel for a piston carried thereby, said piston means comprising:
   a controlled source of pressurized fluid;
   a fluid pressure responsive cylinder slidably carried in said carrier means;
   passage means communicating said cylinder with said pressurized fluid;
   a fluid pressure responsive piston slidably carried in said cylinder and responsive to said pressurized fluid for actuating said disc brake;
   normally closed valve means operatively connected to said passage means for controlling pressurized fluid flow therethrough to said cylinder; and
   fixed stop means connected to said carrier means;
   said piston being actuated by said pressurized fluid to a predetermined position in said cylinder and into operative engagement with said valve means to actuate the same to an open position thereby pressurizing said cylinder to actuate the same axially relative to said piston and into engagement with said fixed stop thereby extending the range of travel of said piston in said cylinder accordingly.

2. Extensible fluid pressure actuated piston means as set forth in claim 1 wherein:
   said fixed stop means includes a tubular extension fixedly secured at one end to said carrier means and slidably extending through an end wall of said cylinder; and
   a stop member removably secured to the free end of said tubular extension and engaged by said cylinder.

3. Extensible fluid pressure actuated piston means as set forth in claim 2 wherein:
   said valve means is a tubular member slidably carried by said tubular extension for axial movement therethrough and adapted to be engaged by said piston.

4. Extensible fluid pressure actuated piston means as set forth in claim 3 wherein:
   said tubular member is provided with a radially extending flange at one end thereof;
   said piston is provided with a skirt portion adapted to surround said tubular extension and having a radially inwardly extending annular end portion adapted to engage said flange.

5. Extensible fluid pressure actuated piston means as claimed in claim 3 wherein:
   said tubular member normally blocks said passage means and is provided with axially spaced-apart annular seal means to prevent leakage of said pressurized fluid through said passage means.

6. Extensible fluid pressure actuated piston means as claimed in claim 2 wherein:
   said end wall is exposed on a first side to said passage downstream from said valve means and on a second side to said pressurized fluid;
   said first and second sides having a differential effective area and corresponding force unbalance whereby said cylinder is held in a retracted position until said valve means is opened to vent said pressurized fluid to said first side to reverse the force unbalance acting on said cylinder thereby actuating the same into engagement with said fixed stop.

7. Extensible fluid pressure actuated piston means as claimed in claim 4 wherein:
   said radially inwardly extending annular end portion is an annular member having screw threads formed on the radially outermost side thereof;

said piston skirt portion having a threaded portion adapted to receive said annular member.

8. Extensible fluid pressure actuated piston means as claimed in claim 7 wherein:

said annular member is provided with axially extending pins adapted to slidably engage mating openings in said end wall to retain said annular member against rotational movement thereby facilitating assembly of said piston and said annular member.

* * * * *